J. V. ROBINSON.

AUTOMATIC TRAIN PIPE CONNECTOR.

APPLICATION FILED OCT. 30, 1919.

Reissued Mar. 15, 1921. 15,066.

Inventor

Joseph V. Robinson,

Foster, Freeman, Watson & Coit,

Attorneys.

UNITED STATES PATENT OFFICE.

JOSEPH V. ROBINSON, OF SANTA MONICA, CALIFORNIA.

AUTOMATIC TRAIN-PIPE CONNECTOR.

15,066. Specification of Reissued Letters Patent. Reissued Mar. 15, 1921.

Original application filed July 25, 1913, Serial No. 781,194. Divided and application filed March 14, 1914, Serial No. 824,835. Original No. 1,245,791, dated November 6, 1917. Application for reissue filed October 30, 1919. Serial No. 334,588.

*To all whom it may concern:*

Be it known that I, JOSEPH V. ROBINSON, a citizen of the United States, and a resident of Santa Monica, county of Los Angeles, State of California, formerly of Chevy Chase, county of Montgomery, State of Maryland, have invented certain new and useful Improvements in Automatic Train-Pipe Connectors, of which the following is a specification.

This is a division of my application Serial Number 781,194, filed July 25, 1913, for improvements in automatic train pipe connectors, and the invention hereinafter described has for its object to provide an improved connector head comprising halves and having guiding members equipped with interlocking portions for preventing localization thereon of the strains of service; to provide on each half of the head a novel clamp for securely tying the end of the buffer spring to the coupling head, and to provide means for preventing incorrect assembly of the head upon its support.

The invention consists in the improvements, combinations and constructions hereinafter described, pointed out in the appended claims, and illustrated in the accompanying drawings, in which:

Figure 1:
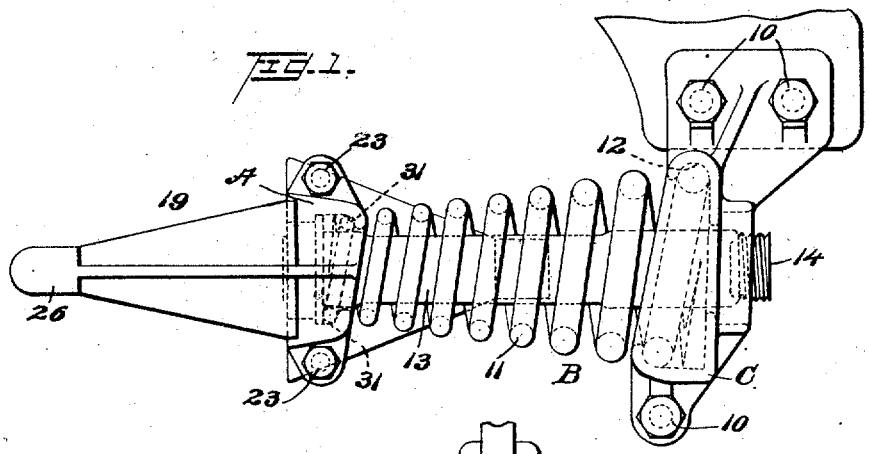
Figure 1 is a side elevation of my improved connector.
Figure 2:
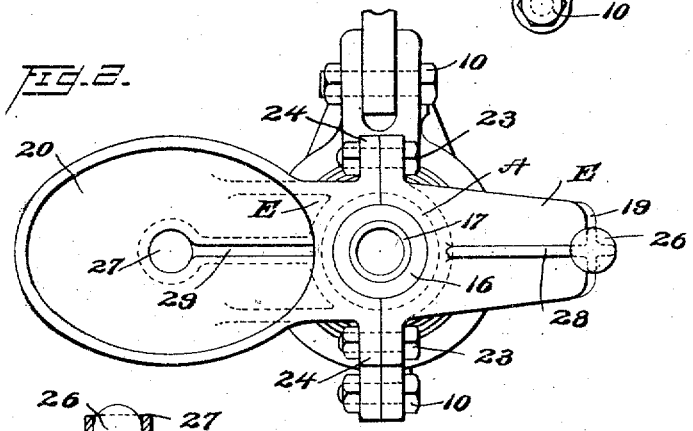
Fig. 2 is an end view thereof.

Referring to the drawings: My improved connector head A is shown mounted on a yieldable support B comprising a two-piece base C bolted together and to the car by bolts 10, and comprising also a spring 11 interposed between the connector head and base. The spring is conical in outline, coiled of a gradually tapering bar and is locked in a recess 12 of the base by the the aforesaid bolts. A fluid conduit 13 lies within the spring, extends axially thereof through an opening in the base C, and receives the hose of the car at 14. The forward end of the conduit is provided with a shoulder or annular seat 15 for the spring 11 and with a head 16 carrying a suitable gasket 17, and carrying also lugs 18 of varying size for insuring correct positioning of the coupling head A upon the said portion 16 of the conduit.

To accurately aline the gaskets 17 of mating heads, I provide the coupling head A with pin and funnel gathering means, 19 indicating the pin and 20 the funnel. The head comprises halves E—E bolted together about the head 16 of the conduit by bolts 23, which extend through perforated ears or lugs 24, on each of the said halves of the head. Apertures 25 of the head receive the lugs 18 of the conduit, insuring proper assembly of the halves thereon and preventing possible relative rotation of the head and conduit.

Figure 3:
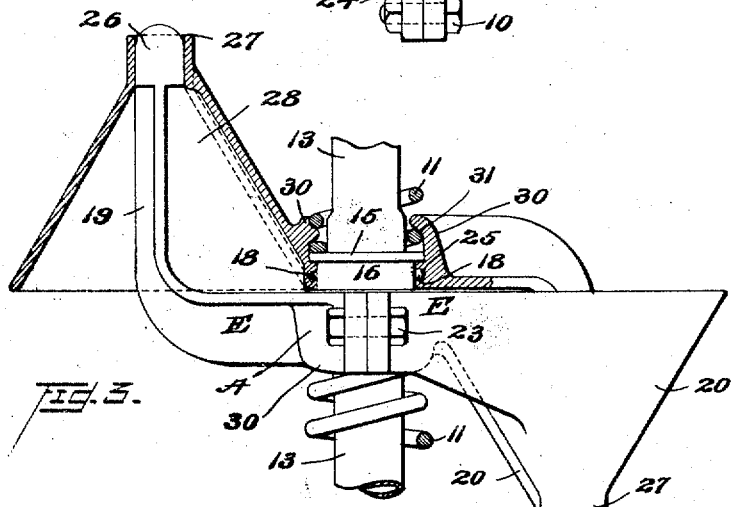
Fig. 3 is a horizontal sectional view of two of the connector heads coupled.

The pin 19 terminates in a cylindrical portion 26 for fitting closely within and interlocking with a corresponding portion 27 of the funnel 20. To prevent localization of the strains of service in these portions of the guiding members I provide the pin with an axially extending rib or boss 28, which protrudes therefrom and extends laterally inwardly and fits closely within a complementary recess or groove 29 in the inner surface of the wall of the funnel 20, of a mating head as shown particularly in Fig. 3. The rib 28 extends forwardly from the transverse vertical coupling face of the head and from a point a short distance beyond the coupling face, this rib flares or extends laterally away from the longitudinal vertical central plane of the head and merges into the main body of the pin member intermediate its base and forward end and beyond said vertical face of the head and when the parts are assembled in service position the rib 28 and the recess 29 are arranged in substantially a horizontal plane. By reason of the close fit between the rib 28 and the recess 29 it is apparent that these parts on mating heads will remain in engagement and prevent localization of strains in the parts 26 and 27 even when the coupling surfaces of the mating heads are slightly separated. As a result of the foregoing construction the twisting and distorting strains occurring upon curves or under other conditions of disalinement of the heads A are distributed throughout the full length of the pin and funnel.

It will be understood that the longitudinal central vertical plane of the pin member 19 passes through the center of the cylindrical portion 26, and, as appears from the drawings, the rib 28 is of greater transverse dimension at a point near the coupling face of the head than at any place forward of such point. It will also be observed that the front face of the funnel member 20 has its front face disposed in substantially the plane of the coupling face of the head and that no part of the funnel member extends beyond its front face.

To tie the buffer spring 11 to the coupling head A, I provide each of the halves E—E of the head with a portion 30 having a semicircumferential recess or groove 31 for receiving the coils of the apex end of the spring 11, about which end the halves of the head are securely clamped by the bolts 23 with the said spring coils seated in said recess.

When thus clamped in position the apex coils of the spring rest upon the annular seat 15 of the conduit and hold the head against undue axial and rotary movement independent of movement of the spring, and in like manner the spring is locked against such movement in the base C when the halves thereof are clamped together by the bolts 10 in assembling.

From the foregoing description, the operation of my automatic connector will be plain and it will be obvious that any desired type of connector head may be provided with my improved means for locking to it the supporting spring 11 and for securing the halves of the head together. I do not therefore desire to be limited to the exact construction shown and described.

Having thus described my said invention, what I claim as new and desire to secure by United States Letters Patent is:

1. In an automatic train pipe connector, a coupling head having a vertical coupling face and pin and funnel gathering means, said gathering means comprising a pin which projects forwardly beyond said face and is provided with a rib or boss that extends forwardly from the base of the pin and laterally toward the longitudinal central vertical plane of the pin and lies in substantially a horizontal plane, the front portion of said rib merging into the pin at a point intermediate the base and the forward end of the pin, and a funnel having an opening therethrough on an axis substantially parallel with the longitudinal axis of said coupling head for receiving said pin of a mating head, said funnel being provided with a recess adapted to receive said boss or rib of said mating head and having also a front face lying in substantially the plane of said coupling face.

2. In an automatic train pipe connector, a coupling head having pin and funnel gathering means and having also a transverse vertical coupling face, said pin lying on one side of the longitudinal central vertical plane of the head and having a rib or boss which lies in substantially a horizontal plane and which extends from the base of the pin, at a point adjacent said central plane of the head, forwardly of said head and laterally toward the longitudinal central vertical plane of said pin and merges into the pin at a point intermediate the base and the forward end of the pin, said funnel lying on the other side of said central plane of the head and having a complementary recess for receiving said rib on a mating head and having also an opening which extends entirely through said funnel for receiving the pin of a counterpart coupling head.

3. In an automatic train pipe connector, the combination with a suitable support therefor, of a coupling head carried by said support and having a substantially flat transverse vertically disposed coupling face adapted to abut the similar face of a counterpart head, and pin and funnel gathering means on said coupling head, the funnel member of said means being disposed with its front face in approximately the plane of said coupling face and having an opening which extends entirely through the funnel in the direction of said support, the pin member of said means being extended forwardly from said coupling face and having a rib or boss which is arranged in substantially a horizontal plane and which extends forwardly from said coupling face from a point adjacent the longitudinal vertical central plane of said coupling head and laterally from such plane toward the longitudinal central vertical plane of said pin member, said funnel member being provided with a recess for receiving said rib or boss of a counterpart head, and said pin member being the only part of said coupling head which extends forwardly of said coupling face for the purpose of alining opposing coupling heads during initial movement of such heads in the act of coupling.

4. In an automatic train pipe connector, a coupling head having a substantially flat vertically disposed coupling face and having also a hollow fluid conduit located on the longitudinal center line of said head and adapted to make a butt joint with a complementary conduit in an opposing head, and pin and funnel gathering means on said coupling head, the funnel member of said means being disposed on one side of said conduit with its front face located in substantially the plane of said coupling face, and the pin member of said means being located on the other side of said conduit and being extended forwardly from said coupling face and provided with a rib or boss which lies in substantially a horizontal plane and which, from a point adjacent said conduit, extends forwardly of such conduit and laterally toward the longitudinal central vertical plane of said pin, the forward portion of said rib or boss merging into said pin at a point intermediate the base and the forward end of the pin, said funnel being provided with a longitudinally extending opening through which the pin member of a mating head projects in service with its apex lying behind the rear face of said coupling head, said funnel being provided also with a recess or groove adjacent said fluid conduit for receiving said rib or boss on a mating coupling head.

5. In an automatic train pipe connector, a coupling head having a substantially flat vertically disposed coupling face and having also a hollow fluid conduit located on the longitudinal center line of said head and adapted to make a butt joint with a complementary conduit in an opposing head, and pin and funnel gathering means on said coupling head, the funnel member of said means being disposed on one side of said conduit with its front face located in substantially the plane of said coupling face, and the pin member of said means being located on the other side of said conduit and being extended forwardly from said coupling face and provided with a rib or boss which lies in substantially a horizontal plane and which, from a point adjacent said conduit, extends forwardly of such conduit and laterally toward the longitudinal central vertical plane of said pin, the forward portion of said rib or boss merging into said pin at a point intermediate the base and the forward end of the pin, said funnel being provided with a longitudinally extending opening through which the pin member of a mating head projects in service with its apex lying behind the rear face of said coupling head, said funnel being provided also with a recess or groove adjacent said fluid conduit for receiving said rib or boss on a mating coupling head, the transverse dimension of said rib or boss being greater at a point near the coupling face of said head than at any place forward of such point.

6. In an automatic train pipe connector, a coupling head having a substantially flat vertically disposed coupling face and having also a hollow fluid conduit located in the longitudinal center line of said head and adapted to make a butt joint with a complementary conduit in an opposing head, and pin and funnel gathering means on said coupling head, the funnel member of said means being disposed on one side of said conduit with its front face located in substantially the plane of said coupling face, and the pin member of said means being located on the other side of said conduit and being extended forwardly from said coupling face and provided with a rib or boss which lies in substantially a horizontal plane and which, from a point adjacent said conduit, extends forwardly and laterally toward the longitudinal central vertical plane of said pin, the forward portion of said rib or boss merging into said pin at a point intermediate the base and the forward end of the pin, said funnel being provided with a longitudinally extending opening through which the pin member of a mating head projects in service with its apex lying behind the rear face of said coupling head, said funnel being provided also with a recess or groove adjacent said fluid conduit for receiving said rib or boss on a mating coupling head, the longitudinal center line of said pin and funnel and said fluid conduit being in approximately the same horizontal plane.

7. In an automatic train pipe connector, a coupling head having a substantially flat vertically disposed coupling face and having also a hollow fluid conduit located on the longitudinal center line of said head and adapted to make a butt joint with a complementary conduit in an opposing head, and pin and funnel gathering means on said coupling head, the funnel member of said means being disposed on one side of said conduit with its front face located in substantially the plane of said coupling face, and the pin member of said means being located on the other side of said conduit and being extended forwardly from said coupling face and provided with a rib or boss which lies in substantially a horizontal plane and which, from a point adjacent said conduit, extends forwardly at substantially a right angle to said coupling face for a short distance and thence flares laterally toward the longitudinal central vertical plane of said pin, the forward portion of said rib or boss merging into said pin at a point intermediate the base and the forward end of the pin, said funnel being provided with a longitudinally extending opening through which the pin member of a mating head projects in service with its apex lying behind the rear face of said coupling head, said funnel being provided also with a recess or groove adjacent said fluid conduit for receiving said rib or boss on a mating coupling head.

8. In an automatic train pipe connector, a coupling head having pin and funnel gathering means, said pin having a portion thereof provided with an exterior wall extending substantially parallel with the longitudinal axis of the head, said funnel having a complementary portion shaped to receive and closely engage said portion of a mating pin to firmly lock mated coupling heads against relative rocking movement one upon the other, and a coöperating rib and groove on said pin and funnel to prevent localization of stresses in the locking portions of said pin and funnel.

9. In an automatic train pipe connector, a coupling head having pin and funnel gathering means and also having a vertical coupling face, the front end of said pin having a cylindrical portion adapted to interlockingly engage a cylindrical portion on the funnel of a mating coupling head to firmly lock such heads against relative angular movement, said funnel having a recess, and a rib or boss on said pin arranged to engage said recess to prevent localization of strains in said interlocking portions.

10. In an automatic train pipe connector, a coupling head having pin and funnel gathering means, said funnel being cone-shaped and having at its apex a portion provided with inner walls arranged substantially parallel with the longitudinal axis of the head and also having a groove on its inner surface, said pin having on its end a portion adapted to engage and closely fit within the aforenamed portion of the funnel of a mating head to lock the heads against relative angular movement, and also having a rib engaging said groove of said funnel to prevent undue strains occurring on said portions of said pin and funnel.

11. In an automatic train pipe connector, a coupling head having pin and funnel gathering means and having also a transverse vertical coupling face, said pin having on its front end a portion shaped to interlock with a complementary portion on the funnel of a mating head, a rib extending laterally from said pin and forwardly of said coupling face to substantially said interlocking portion of the pin, said funnel having a groove adapted to receive said rib on the pin of a mating coupling head.

12. In an automatic train pipe connector, the combination with a coupling head having a fluid conduit and a support for said head, of guiding means on said head of the pin and funnel type, the pin member of said guiding means being provided with a boss or rib which extends laterally from the axis of said pin member and substantially from the base thereof and flares from a point adjacent said conduit into the main body of said pin member and is adapted to rest in a recess groove therefor in one side of the funnel member of said guiding means on a mating coupling head, said recess or groove being located oppositely of said boss or rib and in the same horizontal plane.

13. In an automatic train pipe connector, the combination of a coupling head provided with a fluid conduit, a support for said head, and pin and funnel guiding means on said head, the pin member of said guiding means being provided on one side of said conduit and adjacent thereto with a rib or boss which extends from the base of said pin forwardly and laterally of said head and terminates in the main body of said pin member, and the funnel member of said guiding means being provided on that side of said conduit which is opposite said rib with a recess or groove extending longitudinally of said conduit and into which recess or groove said rib or boss on a mating coupling head is adapted to pass when two said connectors couple up in service.

14. In an automatic train pipe coupling, the combination of a coupling head comprising halves, a support for the head, and means for securing said halves together about said support.

15. In an automatic train pipe connector, the combination of a sectional coupling head, a support adapted to be attached to a car, a member extending from said support, and means for securing the sections of the coupling head together about said member.

16. In an automatic train pipe connector, the combination of a coupling head formed of two parts and means for securing the same together, a member separate from the head and extending therefrom for yieldingly supporting the head, and coöperating means carried by said member and said parts for insuring the correct positioning of said head thereon in assembling.

17. In an automatic train pipe connector, the combination of a two-piece coupling head, a member extending through said head for yieldingly sustaining it, and means for preventing incorrect assembling of said pieces on said member.

18. In an automatic train pipe connector, the combination of a support, a connector head carried thereby and comprising members, one of the members having a semicircumferential recess for receiving said support, and means for securing together the parts of said head with said support seated in said recess.

19. In an automatic train pipe connector, the combination of a support, a coupling head comprising two members each provided with a recess for receiving said support, and means for securing together the parts of said head with said support seated in said recess.

20. In an automatic train pipe connector, the combination of a spring, a connector head provided with recessed portions adapted to embrace said spring, and means for securing together said portions with said spring mounted in said recess.

21. In an automatic train pipe connector, the combination of a conduit, a spring surrounding the conduit, a rigid connector head, and a common means surrounding both the spring and conduit for securing the connector head directly to said conduit and said spring.

22. In an automatic train pipe connector, the combination of a connector head, a fluid conduit extending through the head and having a shoulder abutting the head, a spring surrounding the conduit and abutting said shoulder, and means for securing the head to the conduit and the spring to the head with the spring pressing against said shoulder.

In testimony whereof I affix my signature.

JOSEPH V. ROBINSON.

Witnesses:

JAMES A. WATSON,
ROBERT C. WATSON.